United States Patent
Dry

(10) Patent No.: US 7,188,882 B2
(45) Date of Patent: Mar. 13, 2007

(54) MULTI-PURPOSE HOLDER INSTALLED IN A VEHICLE

(75) Inventor: Alan George Dry, Grosse Pointe Woods, MI (US)

(73) Assignee: Lear Corporation, Southfield, MI (US)

( * ) Notice: Subject to any disclaimer, the term of this patent is extended or adjusted under 35 U.S.C. 154(b) by 34 days.

(21) Appl. No.: 10/826,764

(22) Filed: Apr. 16, 2004

(65) Prior Publication Data

US 2005/0230993 A1    Oct. 20, 2005

(51) Int. Cl.
*B60N 3/12* (2006.01)

(52) U.S. Cl. ............... 296/37.8; 296/37.1; 224/539; 224/549; 224/553

(58) Field of Classification Search ......... 296/37.1, 296/37.7, 37.8, 37.14, 37.16; 224/281, 539, 224/549, 552, 553, 554, 570, 929
See application file for complete search history.

(56) References Cited

U.S. PATENT DOCUMENTS

| | | | | |
|---|---|---|---|---|
| 5,556,017 A | * | 9/1996 | Troy | ............... 224/549 |
| 5,836,496 A | * | 11/1998 | Levin et al. | ........ 296/37.8 |
| 5,996,866 A | * | 12/1999 | Susko et al. | ........ 224/281 |
| 6,056,175 A | * | 5/2000 | Mieglitz et al. | ........ 224/282 |
| 6,139,096 A | * | 10/2000 | Anderson et al. | ...... 297/188.1 |
| 6,203,088 B1 | * | 3/2001 | Fernandez et al. | ....... 296/37.8 |
| 6,409,136 B1 | * | 6/2002 | Weiss et al. | ........ 248/311.2 |
| 6,419,314 B1 | * | 7/2002 | Scheerhorn | ........ 296/37.8 |
| 6,435,587 B1 | * | 8/2002 | Flowerday et al. | ....... 296/37.8 |
| 6,616,205 B2 | * | 9/2003 | Bruhnke et al. | ........ 296/37.8 |
| 6,663,155 B1 | * | 12/2003 | Malone et al. | ........ 296/37.8 |
| 6,719,343 B2 | * | 4/2004 | Emerling et al. | ....... 296/24.34 |
| 6,719,367 B2 | * | 4/2004 | Mic et al. | ........ 296/37.8 |
| 6,929,304 B1 | * | 8/2005 | Dry et al. | ........ 296/37.8 |
| 2002/0008415 A1 | * | 1/2002 | Bollaender et al. | ..... 297/188.17 |
| 2003/0122392 A1 | * | 7/2003 | Larsen et al. | ........ 296/37.8 |
| 2003/0155786 A1 | | 8/2003 | Kim et al. | |
| 2003/0155787 A1 | | 8/2003 | Lein et al. | |
| 2003/0234550 A1 | * | 12/2003 | Brooks et al. | ......... 296/24.1 |
| 2005/0116488 A1 | * | 6/2005 | Sakakibara | ........ 296/37.8 |

* cited by examiner

*Primary Examiner*—Lori L. Coletta
(74) *Attorney, Agent, or Firm*—MacMillan, Sobanski & Todd, LLC

(57) ABSTRACT

An interior trim component for a vehicle includes a body and an article holder. The article holder has a support structure for supporting an article. The article holder is pivotally connected to the body and movable between a storage position and a deployed position. In the deployed position the support structure of the article holder is higher relative to a position of the support structure when the article holder is in the storage position.

19 Claims, 3 Drawing Sheets

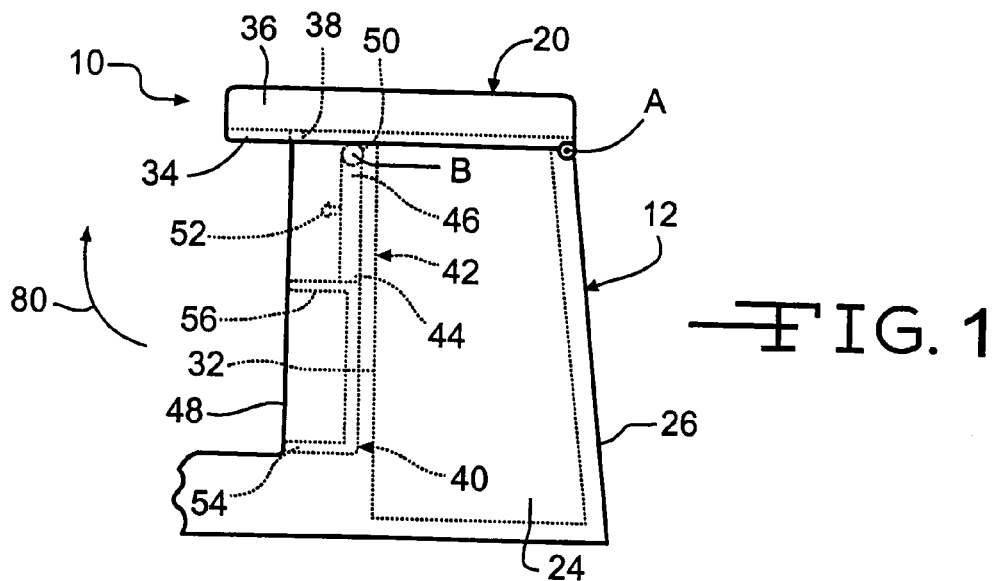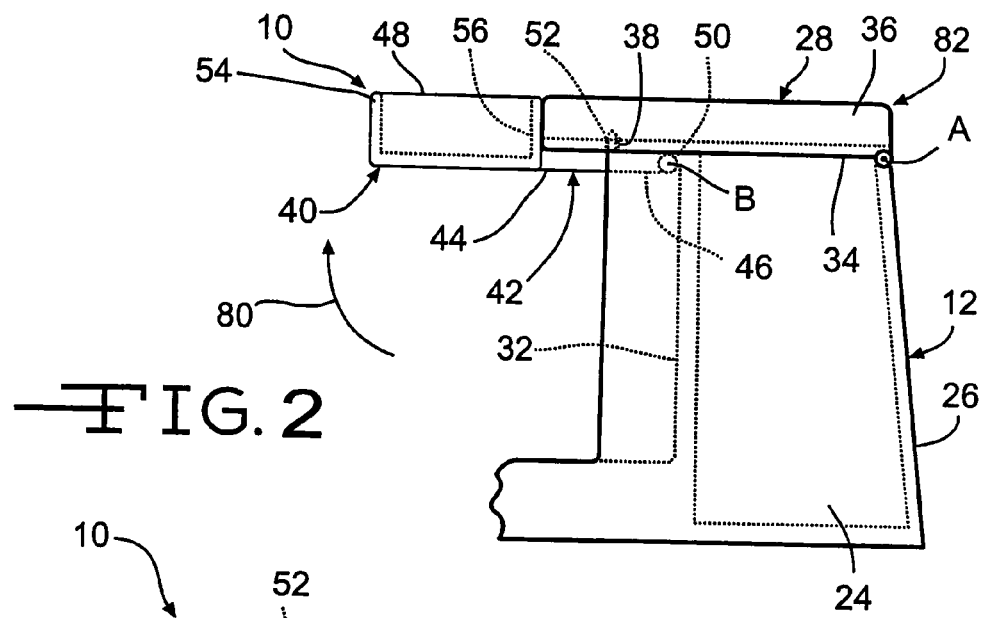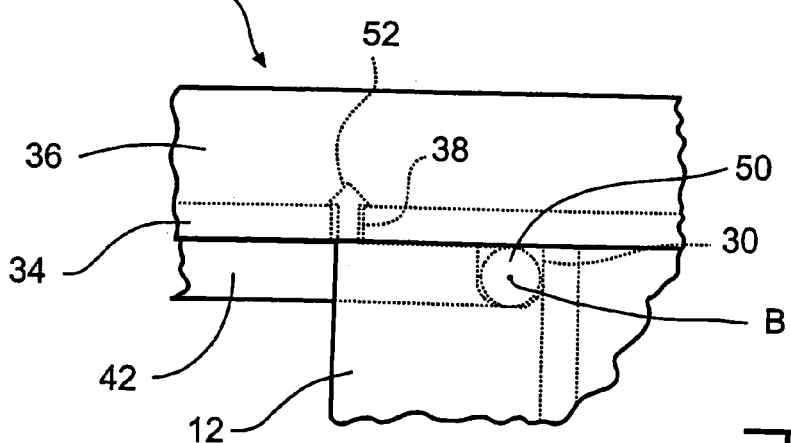

MULTI-PURPOSE HOLDER INSTALLED IN A VEHICLE

TECHNICAL FIELD

This invention relates to a holder for supporting an object. More particularly, the invention relates to a multi-purpose holder for supporting an object in a vehicle.

BACKGROUND OF THE INVENTION

Vehicle interiors typically include a variety of decorative and functional trim panels. For example, the front area of the interior of a vehicle, generally referred to as the cockpit area, includes an instrument panel, typically formed of a molded plastic material. Vehicles also may include a center console located between the driver and passenger seats for storage and placement of various articles. The instrument panel and/or center console can include a variety of devices for holding beverage containers, typically known as cup holders. There has also developed a desire on the part of vehicle occupants to store other articles or objects in a vehicle such that the objects are easy to view and within easy reach of the occupant. Known cup holders typically are adapted to hold known beverage containers, such as cans, cups, and bottles, and known objects, such as wireless telephones. Cup holders capable of holding objects or containers having a variety of sizes are known. However, such cup holders are often difficult to use, particularly with objects such as wireless telephones. It would therefore be advantageous if there could be developed an improved holder for supporting objects in a vehicle.

SUMMARY OF THE INVENTION

The present invention relates to an interior trim component for a vehicle. The trim component includes a body and an article holder. The article holder has a support structure for supporting an article. The article holder is pivotally connected to the body and movable between a storage position and a deployed position. In the deployed position the support structure of the article holder is higher relative to a position of the support structure when the article holder is in the storage position.

Other advantages of this invention will become apparent to those skilled in the art from the following detailed description of the invention, when read in light of the accompanying drawings.

BRIEF DESCRIPTION OF THE DRAWINGS

FIG. 1 is a side elevational view of a first embodiment of the multi-purpose article holder according to the invention, showing the article holder in the storage position.

FIG. 2 is a side elevational view of the multi-purpose article holder illustrated in FIG. 1, showing the article holder in the deployed position.

FIG. 3 is an enlarged side elevational view of the latch illustrated in FIGS. 1 and 2, and showing the article holder in the deployed position.

DETAILED DESCRIPTION OF THE INVENTION

Figure 4:
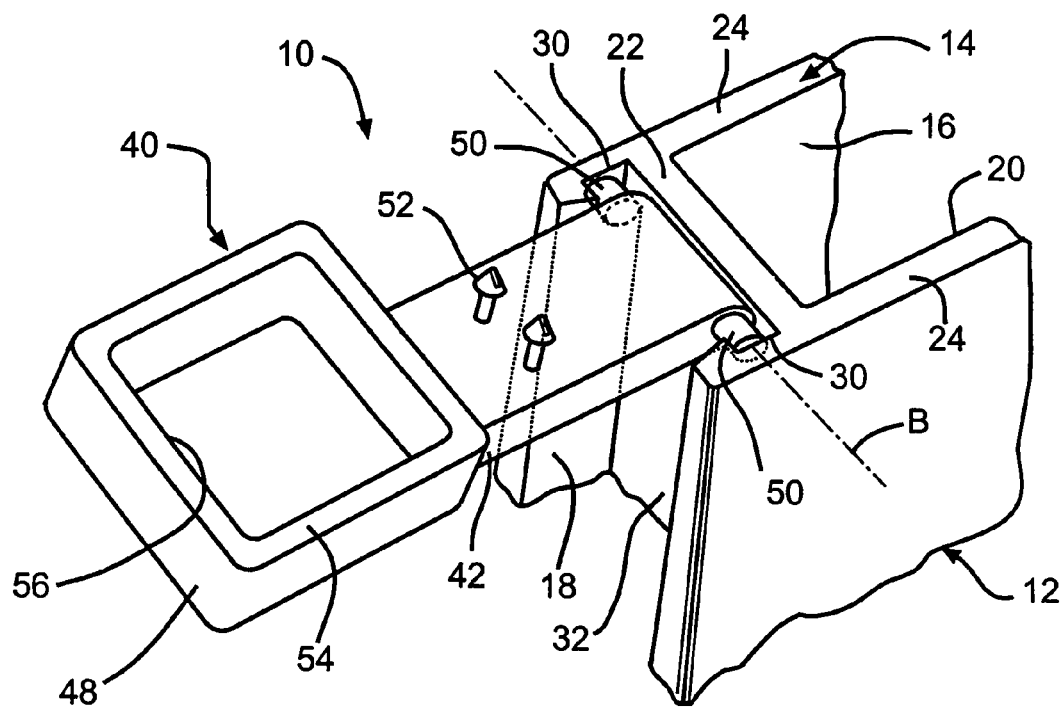
FIG. 4 is a perspective view of the multi-purpose article holder illustrated in FIGS. 1 and 2, showing the article holder in the deployed position.

Referring now to the drawings, there is illustrated in FIGS. 1 and 2, an interior trim component or center floor console assembly, indicated generally at 10. The interior trim component 10 is an example of a trim component for mounting in an interior cabin of a vehicle. It will be appreciated however, that the console assembly 10 of the subject invention may be any type of trim component or trim component assembly associated with a vehicle. Other suitable examples of trim component assemblies include instrument panels, door panels, overhead consoles, floor structures, armrest assemblies, and other various interior components for mounting within the vehicle.

FIGS. 1 through 4, inclusive, illustrate a first embodiment of the console assembly 10. As shown in FIGS. 1 and 2, the console assembly 10 includes a body or interior vehicle trim panel 12. In the exemplary embodiment illustrated in FIGS. 1 and 2, the interior vehicle trim panel 12 is a console 12 for mounting in an interior cabin of a vehicle, such as an automobile, a boat, or an airplane. It will be appreciated however, that the console 12 of the subject invention may be any type of interior trim panel associated with a vehicle, and can be located at any desired position in the vehicle. The console 12 can be attached to the vehicle by any desired means, such as threaded fasteners or with adhesive. Other suitable examples of trim panels include trim panels associated with trim component assemblies such as instrument panels, door panels, overhead consoles, floor structures, armrest assemblies.

The console 12 includes a console wall 14 defining a cavity or storage compartment 16, an interior surface 18, an open end 20, a forward wall 22, opposing side walls 24, and a rearward wall 26. A lid 28 is preferably hingedly or pivotally connected adjacent the rearward wall 26 of the console 12 about a pivot axis A. A pair of slots or notches 30 is formed on the interior surface 18 of the console wall 14. As best shown in FIG. 4, the opposing side walls 24 define a recess 32 outward of the forward wall 22 of the console 12.

As shown in the exemplary embodiment illustrated in FIGS. 1 and 2, the lid 28 is shown hingedly or pivotally connected adjacent the rearward wall 26 of the console 12. It will be understood however, that the lid 28 can be hingedly or pivotally connected at an upper edge of one of the side walls 24, or adjacent the forward wall 22. The lid 28 can also be movably connected to the console 12 by any other desired means.

Preferably, as best shown in FIG. 4, the notches 30 are disposed opposite one another on opposing interior surfaces 18 of the console wall 14 adjacent the forward wall 22 of the console 12. It will be understood however, that the notches 30 can be formed at any desired location within the console 12. The console 12 can be formed from any desired substantially rigid material, such as plastic. Polypropylene, nylon, acrylonitrile butadiene styrene (ABS), and polycarbonate acrylonitrile butadiene styrene (PCABS) are preferred materials for the console because of their strength and rigidity.

Preferably, the lid 28 defines an armrest 28. The armrest 28 preferably includes a body having a substrate 34 formed of plastic material, such as acrylonitrile butadiene styrene (ABS) or glass-filled polypropylene. The armrest 28 further includes an outer surface or skin 36. Preferably, the skin 36 is formed of plastic material, such as vinyl or thermoplastic olefin (TPO). A plurality of latch apertures 38 is formed in the substrate 34.

The console assembly 10 further includes a multi-purpose article holder 40. The article holder 40 includes a holder arm 42 having a first end 44 and a second end 46. A support structure 48 is connected to the first end 44 of the holder arm 42. A pair of substantially cylindrical trunnions 50 extends outwardly from the second end 46 of the holder arm 42. The trunnions 50 are disposed in the notches 30 of the console 12, thereby pivotally connecting the article holder 40 to the console 12 about a pivot axis B. Preferably, the trunnions 50 are removably mounted in the notches 30, such that the article holder 40 is easily removed from the console 12 as described herein.

As best shown in FIGS. 3 and 4, a plurality of latches 52 extend outwardly (upwardly as viewed in FIGS. 3 and 4) from the holder arm 42 intermediate the first and second ends 44 and 46. Although two latches 52 are shown in the exemplary embodiment illustrated in FIG. 4, it will be understood that any desired number of latches 52, such as one latch or three latches, can be provided. It will be further understood that other desired latching mechanisms can be used, such as a latching mechanism (not shown) disposed between the article holder 40 and the console 12.

As best shown in FIGS. 1 and 2, the support structure 48 includes a cavity wall 54 defining a cavity 56 for supporting an article, such as a wireless telephone (as shown at 76 in FIG. 6), a global positioning system (GPS) receiver, or a personal digital assistant (PDA). If desired, an article retainer (not shown) can be provided for securing the article within the cavity. Examples of such retainers include resilient bands, netting, spring biased clips, and the like.

Figure 6:
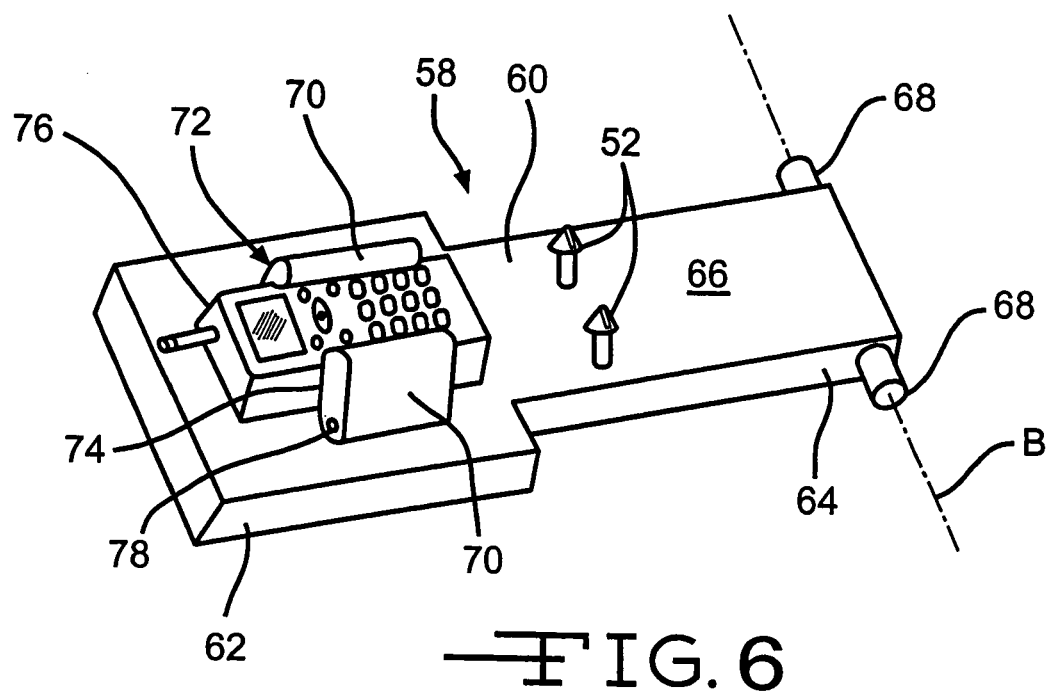
FIG. 6 is a perspective view of a second embodiment of the multi-purpose article holder illustrated in FIG. 4.

A second embodiment of the article holder is illustrated generally at 58 in FIG. 6. As shown in FIG. 6 the article holder 58 includes a holder arm 60 having a first end 62, a second end 64, and a substantially flat support surface 66. A pair of substantially cylindrical trunnions 68 extend outwardly from the second end 64 of the holder arm 60. A pair of engagement members 70 define a support structure or clip 72 and extend outwardly from the support surface 66 at the first end 62 of the holder arm 60. Each engagement member 70 includes an engagement surface 74. Preferably, the engagement members 70 are inwardly biased, such that the engagement surfaces 74 apply a force on an article, such as a wireless telephone 76, thereby securing the telephone 76 between the engagement members 70. The engagement members 70 are preferably biased by a spring, such as the spring 78 schematically illustrated in FIG. 6.

In operation, a vehicle occupant applies a first force to the article holder 40 in the direction of an arrow 80 (upward as viewed in FIGS. 1 and 2). The article holder 40 is thereby rotated upwardly from a storage position, as shown in FIG. 1, to a deployed position, as shown in FIG. 2. As shown in FIG. 1, at least a portion of the article holder 40 is disposed in the recess 32 when in the storage position. If desired, the entire article holder 40 can be disposed in the recess 32 when in the storage position.

It will be understood that in the deployed position, as shown in FIG. 2, the support structure 48 of the article holder 40 is higher relative to the position of the support structure 48 when the article holder 40 is in the storage position, as shown in FIG. 1. Further, when in the deployed position, the article holder 40 is preferably forward relative to the article holder 40 when the article holder 40 is in the storage position. Preferably, the article holder 40 is moved upwardly until the latches 52 are inserted into the apertures 38 in a locking engagement, thereby releasably connecting the article holder 40 to the armrest 28, and defining an article-holder assembly 82.

Figure 5:
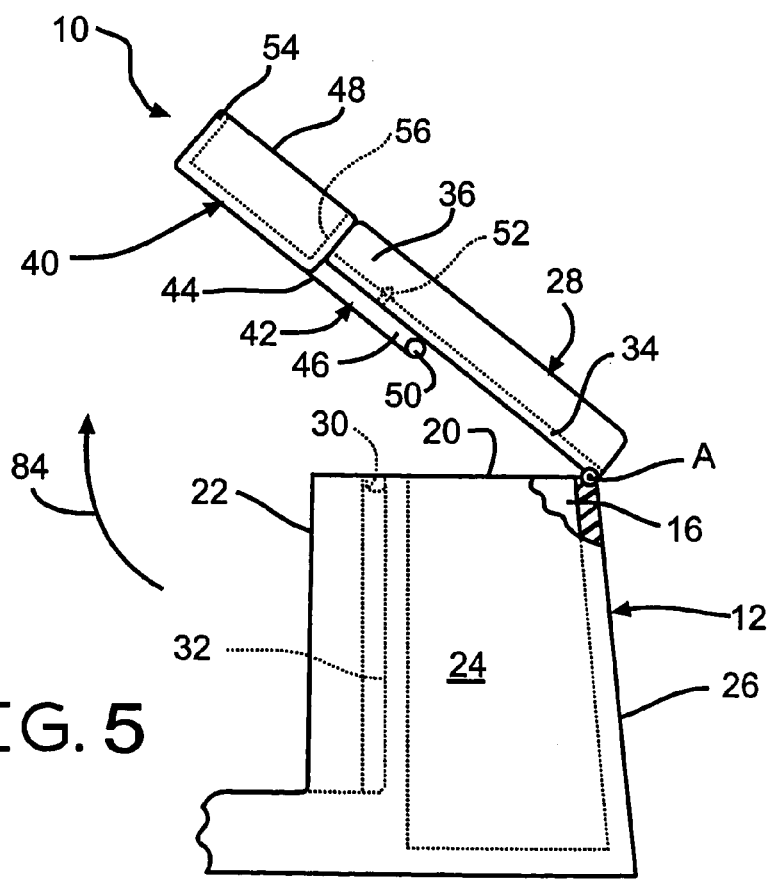
FIG. 5 is a side elevational view of the multi-purpose article holder illustrated in FIGS. 1 and 2, showing the console in the open position.

A vehicle occupant may desire access to the storage compartment 16 of the console 12. When the vehicle occupant applies a second force to the article-holder assembly 82 in the direction of an arrow 84 (upward as viewed in FIG. 5), the article-holder assembly 82 is thereby rotated about the pivot axis A. The article-holder assembly 82 is further rotated upwardly from the deployed position, as shown in FIG. 2, to an open position exposing the storage compartment 16, as shown in FIG. 5. As the article-holder assembly 82 moves from the deployed position to the open position, the trunnions 50 are moved outwardly of the notches 30.

Figure 7:
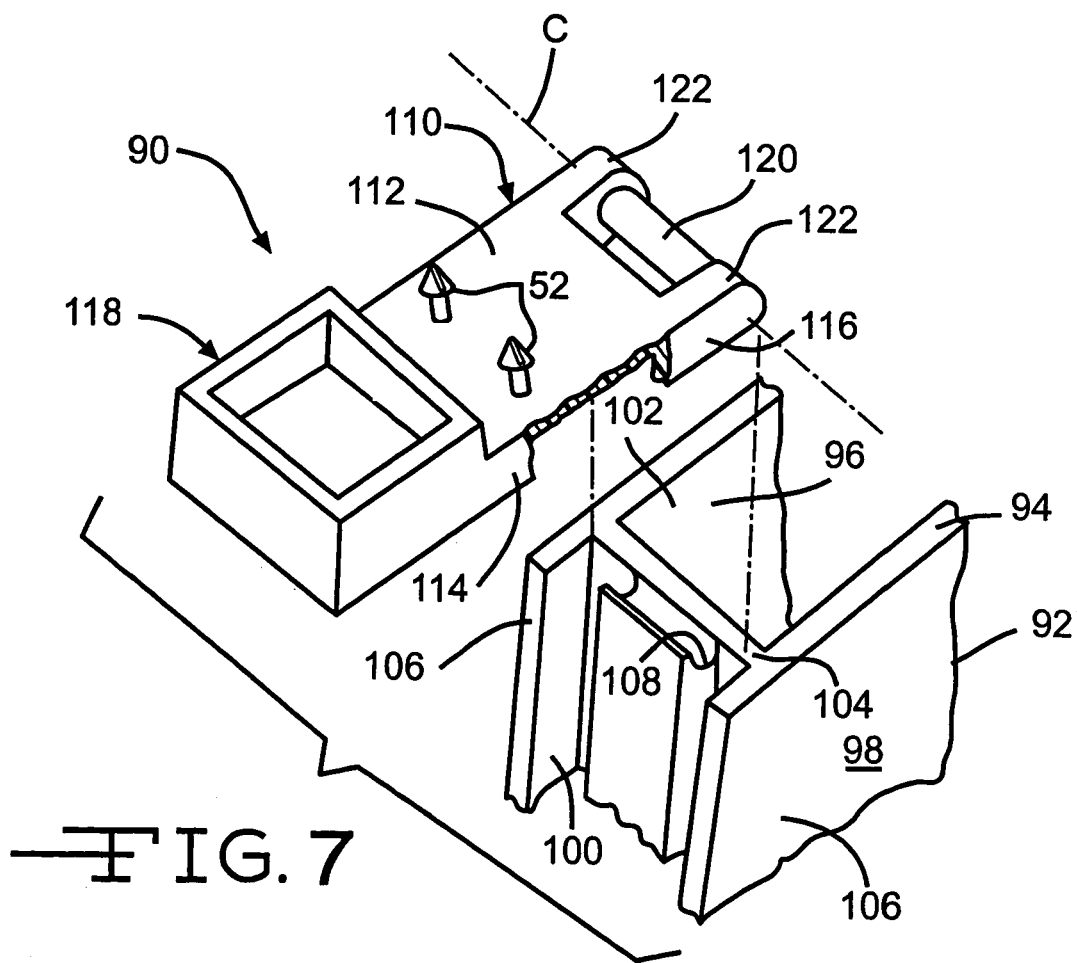
FIG. 7 is an exploded perspective view of a third embodiment of the multi-purpose article holder and console illustrated in FIG. 4.

FIG. 7 illustrates a third embodiment of the console assembly 90. The console assembly 90 includes a console 92 for mounting in an interior cabin of a vehicle. The console 92 includes a console wall 94 defining a cavity or storage compartment 96, an exterior surface 98, an interior surface 100, an open end 102, a forward wall 104, opposing side walls 106, and a rearward wall (not shown, but substantially identical to the rearward wall 26 shown in FIGS. 1 and 2). A substantially upwardly facing groove 108 is formed in a portion of the forward wall 104 of the console 92.

The console assembly 90 further includes an article holder 110. The article holder 110 includes a holder arm 112 having a first end 114 and a second end 116. A support structure 118 is connected to the first end 114 of the holder arm 112. A substantially cylindrical trunnion 120 is centrally disposed between two rearwardly extending members 122 of the holder arm 112. The trunnion 120 is disposed in the groove 108 of the console 12, thereby pivotally connecting the article holder 110 to the console 92 about a pivot axis C. Preferably, the trunnion 120 is removably mounted in the groove 108, such that the article holder 110 is easily removable from the console 92. A plurality of latches 52 extend outwardly from the holder arm 112 intermediate the first and second ends 114 and 116.

The principle and mode of operation of this invention have been described in its preferred embodiments. However, it should be noted that this invention may be practiced otherwise than as specifically illustrated and described without departing from its scope.

What is claimed is:

1. An interior trim component for a vehicle, said trim component comprising:
   a body having a forward end and a rearward end; and
   an article holder having a support structure for supporting an article, said article holder pivotailly connected to said body adjacent said forward end of said body and movable between a storage position and a deployed position, wherein in the deployed position said support structure of said article holder is higher relative to a position of said support structure when said article holder is in the storage position, and wherein said article holder is removably mounted to said body when in the deployed position.

2. The interior trim component according to claim 1, wherein said body is an interior vehicle trim panel.

3. The interior trim component according to claim 1, wherein said forward end of said body includes a recess, and wherein at least a portion of said article holder is disposed within said recess when said article holder is in the storage position.

4. The interior trim component according to claim 1, wherein said body defines a vehicle console.

5. The interior trim component according to claim 1, wherein said body includes a lid.

6. The interior trim component according to claim 5, wherein said lid is pivotally connected to said body.

7. The interior trim component according to claim 6, wherein said lid is pivotally connected adjacent a rearward end of said body.

8. The interior trim component according to claim 5, wherein said lid defines an armrest.

9. The interior trim component according to claim 5, wherein in the deployed position said article holder is releasably connected to said lid, such that when said article holder is in the deployed position, movement of said lid causes said article holder to move.

10. The interior trim component according to claim 1, wherein in the deployed position said support structure is forward relative to a position of said support structure when said article holder is in the storage position.

11. The interior trim component according to claim 1, wherein said support structure includes a wall defining a cavity for supporting an article.

12. The interior trim component according to claim 1, wherein said support structure is a clip for securing an article to said article holder.

13. The interior trim component according to claim 12, wherein said clip is spring biased.

14. The interior trim component according to claim 1, further including a latching mechanism for releasably latching said article holder in the deployed position.

15. The interior trim component according to claim 14, wherein said latching mechanism is disposed between said body and said article holder.

16. The interior trim component according to claim 14, wherein said latching mechanism comprises a latch extending outwardly from said article holder, and wherein said body includes an aperture for receiving said latch.

17. A console assembly for a vehicle, said console assembly comprising:
   a console body having a lid, said lid pivotally connected to said console body; and
   an article holder having a support structure for supporting an article;
   wherein said article holder is pivotally connected to said console body and movable between a storage position and a deployed position;
   wherein in the deployed position, said support structure of said article holder is higher relative to a position of said support structure when said article holder is in the storage position;
   wherein said article holder is removably mounted to said console body when in the deployed position; and
   wherein in the deployed position said article holder is releasably connected to said lid, such that when said article holder is in the deployed position, movement of said lid causes said article holder to move.

18. An interior trim component for a vehicle, said trim component comprising:
   a body;
   an article holder removably mounted to said body, said article holder having a support structure for supporting an article, said article holder pivotally connected to said body and movable between a storage position and a deployed position, wherein in the deployed position said support structure of said article holder is higher relative to a position of said support structure when said article holder is in the storage position; and
   a latching mechanism for releasably latching said article holder in the deployed position, wherein said latching mechanism is disposed between said body and said article holder.

19. An interior trim component for a vehicle, said trim component comprising:
   a body;
   an article holder removably mounted to said body, said article holder having a support structure for supporting an article, said article holder pivotally connected to said body and movable between a storage position and a deployed position, wherein in the deployed position said support structure of said article holder is higher relative to a position of said support structure when said article holder is in the storage position; and
   a latching mechanism for releasably latching said article bolder in the deployed position, wherein said latching mechanism comprises a latch extending outwardly from said article holder, and wherein said body includes an aperture for receiving said latch.

* * * * *